US012659876B2

(12) United States Patent
Lou et al.

(10) Patent No.: US 12,659,876 B2
(45) Date of Patent: Jun. 16, 2026

(54) TRANSMIT ENERGY ALLOCATION AMONG DIFFERENT RADIOS

(71) Applicant: QUALCOMM Incorporated, San Diego, CA (US)

(72) Inventors: Huang Lou, Santee, CA (US); Arnaud Meylan, San Diego, CA (US); Farhad Meshkati, San Diego, CA (US); Reza Shahidi, La Jolla, CA (US); Lin Lu, San Diego, CA (US); Jagadish Nadakuduti, Bermuda Dunes, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 18/325,773

(22) Filed: May 30, 2023

(65) Prior Publication Data

US 2023/0397123 A1     Dec. 7, 2023

Related U.S. Application Data

(60) Provisional application No. 63/369,329, filed on Jul. 25, 2022, provisional application No. 63/365,697, filed on Jun. 1, 2022.

(51) Int. Cl.
*H04W 52/34* (2009.01)

(52) U.S. Cl.
CPC .................................. *H04W 52/346* (2013.01)

(58) Field of Classification Search
CPC .......................... H04W 52/24; H04W 52/346
See application file for complete search history.

(56) References Cited

U.S. PATENT DOCUMENTS

| | | | | |
|---|---|---|---|---|
| 10,425,171 B2* | 9/2019 | Seyed | .................. | H04B 1/3833 |
| 11,228,987 B2* | 1/2022 | Krenz | .................. | H04W 52/34 |
| 11,457,416 B2* | 9/2022 | Nadakuduti | ........ | H04W 52/225 |
| 11,536,759 B2* | 12/2022 | Strutt | .................. | H04B 1/3838 |

(Continued)

FOREIGN PATENT DOCUMENTS

| | | |
|---|---|---|
| WO | 2020010232 | 1/2020 |
| WO | 2022047028 A1 | 3/2022 |

OTHER PUBLICATIONS

International Search Report and Written Opinion—PCT/US2023/067671—ISA/EPO—Sep. 22, 2023.

*Primary Examiner* — Hai V Nguyen
(74) *Attorney, Agent, or Firm* — Patterson & Sheridan, L.L.P/Qualcomm

(57) ABSTRACT

Certain aspects of the present disclosure provide techniques for transmit energy allocation. A method that may be performed by a wireless device includes obtaining reserve information associated with an antenna group associated with a plurality of radios including a first radio and second radios, the first radio communicating via a first type of radio access technology and the second radios communicating via a second type of radio access technology, different from the first type of radio access technology; determining a reserve for each of the radios based at least in part on the reserve information and an active state associated with each of the radios; and transmitting one or more signals using at least one of the radios at a transmit power determined based at least in part on a radio frequency exposure limit associated with each of the radios and the reserve for each of the radios.

30 Claims, 8 Drawing Sheets

(56) References Cited

U.S. PATENT DOCUMENTS

| | | | | |
|---|---|---|---|---|
| 11,689,235 | B2 * | 6/2023 | Zhou ................... | H04B 1/3838 |
| | | | | 370/329 |
| 11,716,695 | B2 * | 8/2023 | Curtiss ............... | H04W 52/245 |
| | | | | 455/522 |
| 11,917,559 | B2 * | 2/2024 | Nadakuduti ........ | H04W 52/367 |
| 12,177,797 | B2 * | 12/2024 | Nadakuduti .......... | H04W 52/42 |
| 12,323,961 | B2 * | 6/2025 | Nadakuduti .......... | H04W 72/56 |
| 12,328,682 | B2 * | 6/2025 | Liu ..................... | H04W 52/346 |
| 2018/0175944 | A1 * | 6/2018 | Seyed .................. | H04B 1/3833 |
| 2020/0314764 | A1 * | 10/2020 | Noh .................... | H04B 7/0617 |
| 2021/0127337 | A1 * | 4/2021 | Nadakuduti ........ | H04W 52/225 |
| 2021/0297104 | A1 * | 9/2021 | Zhou ................... | H04B 1/3838 |
| 2021/0321340 | A1 * | 10/2021 | Krenz ............... | H04W 72/0473 |
| 2022/0070795 | A1 * | 3/2022 | Nadakuduti ........ | H04W 52/367 |
| 2022/0070796 | A1 * | 3/2022 | Nadakuduti ........ | H04B 1/3838 |
| 2022/0116949 | A1 * | 4/2022 | Nadakuduti ...... | H04W 72/0473 |
| 2022/0132438 | A1 * | 4/2022 | Cha .................... | H04W 52/246 |
| 2022/0286974 | A9 * | 9/2022 | Nadakuduti ........ | H04W 52/225 |
| 2023/0016288 | A1 * | 1/2023 | Chauvin ........... | H04W 28/0278 |
| 2023/0156625 | A1 * | 5/2023 | Liu ..................... | H04W 52/346 |
| | | | | 455/522 |
| 2023/0180150 | A1 * | 6/2023 | Nadakuduti ........ | H04W 52/367 |
| | | | | 455/522 |
| 2023/0180151 | A1 * | 6/2023 | Nadakuduti ........ | H04W 52/367 |
| | | | | 370/318 |
| 2024/0106481 | A1 * | 3/2024 | Kumar ............... | H04W 52/367 |
| 2024/0323861 | A1 * | 9/2024 | Chauvin ............ | H04W 52/367 |

* cited by examiner

600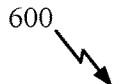

| Transmit Scenario | Radio1 Reserve | Radio2 Reserve | Radio3 Reserve |
|---|---|---|---|
| Only Radio1 actively transmitting in the AG <br> $\sum(radio(active).split\_ratio) =$ <br> radio(1).split\_ratio | 0.6 | 0 | 0 |
| All 3 Radios actively transmitting in the AG <br> $\sum(radio(active).split\_ratio) =$ <br> radio(1).split\_ratio + radio(2).split\_ratio + radio(3).split\_ratio | 0.2 | 0.2 | 0.2 |
| Radio1 and Radio2 actively transmitting in the AG <br> $\sum(radio(active).split\_ratio) =$ <br> Radio(1).split\_ratio + radio(2).split\_ratio | 0.3 | 0.3 | 0 |
| Radio2 and Radio3 actively transmitting in the AG | 0 | 0.3 | 0.3 |
| Only Radio2 actively transmitting in the AG | 0 | 0.6 | 0 |

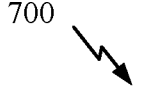

702

Obtain reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology

704

Determine a reserve for each of the plurality of radios based at least in part on the reserve information and an active state associated with each of the plurality of radios

706

Transmit one or more signals using at least one of the radios at a transmit power determined based at least in part on a radio frequency (RF) exposure limit associated with each of the radios and the reserve for each of the radios

FIG. 7

TRANSMIT ENERGY ALLOCATION AMONG DIFFERENT RADIOS

CROSS-REFERENCE TO RELATED APPLICATION(S)

The present application for patent claims benefit of U.S. Provisional Application No. 63/365,697, filed Jun. 1, 2022, and U.S. Provisional Application No. 63/369,329, filed Jul. 25, 2022, each of which is hereby expressly incorporated by reference herein in its entirety.

INTRODUCTION

Field of the Disclosure

Aspects of the present disclosure relate to wireless communications, and more particularly, to radio frequency (RF) exposure compliance.

Description of Related Art

Wireless communication systems are widely deployed to provide various telecommunication services such as telephony, video, data, messaging, broadcasts, etc. Modern wireless devices (such as cellular telephones) are generally mandated to meet radio frequency (RF) exposure limits set by certain governments and international standards and regulations. To ensure compliance with the standards, such devices may undergo an extensive certification process prior to being shipped to market. To ensure that a wireless device complies with an RF exposure limit, techniques have been developed to enable the wireless device to assess RF exposure from the wireless device and adjust the transmission power of the wireless device accordingly for compliance.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide advantages that include improved wireless communication performance and/or efficient energy allocation among radios.

Certain aspects of the subject matter described in this disclosure can be implemented in a method for wireless communication by a wireless device. The method generally includes obtaining reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology. The method also includes determining a reserve for each of the plurality of radios based at least in part on the reserve information and an active state associated with each of the plurality of radios and transmitting one or more signals using at least one of the radios at a transmit power determined based at least in part on a radio frequency (RF) exposure limit associated with each of the radios and the reserve for each of the radios.

Certain aspects of the subject matter described in this disclosure can be implemented in an apparatus for wireless communication. The apparatus generally includes a memory and a processor coupled to the memory. The processor is configured to obtain reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology; determine a reserve for each of the plurality of radios based at least in part on the reserve information and an active state associated with each of the plurality of radios; and transmit one or more signals using at least one of the radios at a transmit power determined based at least in part on a radio frequency (RF) exposure limit associated with each of the radios and the reserve for each of the radios.

Certain aspects of the subject matter described in this disclosure can be implemented in an apparatus for wireless communication. The apparatus generally includes means for obtaining reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology; means for determining a reserve for each of the plurality of radios based at least in part on the reserve information and an active state associated with each of the plurality of radios; and means for transmitting one or more signals using at least one of the radios at a transmit power determined based at least in part on a radio frequency (RF) exposure limit associated with each of the radios and the reserve for each of the radios.

Certain aspects of the subject matter described in this disclosure can be implemented in a computer-readable medium. The computer-readable medium has instructions stored thereon, that when executed by an apparatus, cause the apparatus to perform operations including: obtaining reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology; determining a reserve for each of the plurality of radios based at least in part on the reserve information and an active state associated with each of the plurality of radios; and transmitting one or more signals using at least one of the radios at a transmit power determined based at least in part on a radio frequency (RF) exposure limit associated with each of the radios and the reserve for each of the radios.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 is a table illustrating example reserves for a plurality of radios of an antenna group for different transmit scenarios.

FIG. 7 is a flow diagram illustrating example operations for wireless communication by a wireless device, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
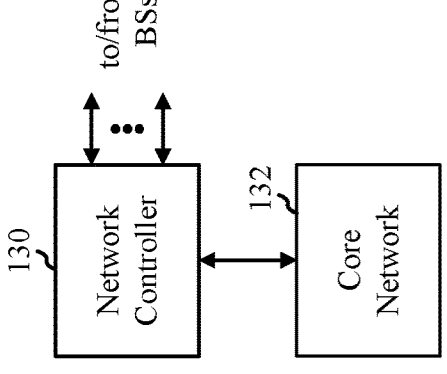
FIG. 1 is a block diagram conceptually illustrating an example wireless communication network, in accordance with certain aspects of the present disclosure.

Aspects of the present disclosure provide apparatus, methods, processing systems, and computer-readable mediums for transmit energy allocation among different radios. The radios may be for several access technologies (RATs).

In certain cases, a wireless communications device may evaluate radio frequency (RF) exposure compliance for two radios of a specific RAT (e.g., Long Term Evolution (LTE) or Fifth Generation New Radio (5G NR)) or a class of RATs, such as wireless wide area network (WWAN) access technologies (e.g., LTE and 5G NR). The wireless device may be configured with a minimum reserve associated with two radios used for WWAN communications and a ratio used to split the minimum reserve among the radios when both radios are actively transmitting at the same time. When both of the radios are transmitting at the same time, the wireless device may divide the minimum reserve among the radios based on the configured ratio. When only one of the radios are transmitting, the wireless device may allocate at least the entire minimum reserve to the respective radio. The wireless device may also support other types of RATs, such as, IEEE 802.11, Bluetooth, satellite communications, device-to-device (e.g., sidelink) communications, vehicle-to-everything (V2X) communications, etc.

Aspects of the present disclosure provide apparatus and methods for allocating transmit energy for three or more radios and/or among radios that communicate via different RATs. For example, a wireless device may allocate a minimum reserve among radios in an antenna group. The radios in the antenna group may communicate via WWAN (e.g., LTE and 5G NR) and wireless local network (WLAN) access technologies (e.g., IEEE 802.11). The wireless device may allocate the minimum reserve among the radios that will be actively transmitting at the same time. In some cases, the wireless device may be configured with a reserve dedicated to a particular RAT, such as Bluetooth, where other radios in the antenna group may share a minimum reserve, as further described herein.

The apparatus and methods for allocating transmit energy among radios described herein may facilitate improved wireless communication performance (e.g., improved signal quality at the receiver, lower latencies, higher throughput, etc.). For example, a wireless device may allocate a portion of a minimum reserve to the radios that are actively transmitting, such that the other radio(s), which are not transmitting, may not be allocated any of the reserve. Such an allocation may allow the radios actively transmitting to obtain a reserve that facilitates improved wireless communication performance. The energy allocation described herein may allow for efficient allocation of a reserve among radios using different RATs.

As used herein, a radio may refer to a physical or logical transmission path associated with one or more active frequency bands, transceivers, and/or radio access technologies (RATs) (e.g., code division multiple access (CDMA), LTE, NR, IEEE 802.11, Bluetooth, etc.) used for wireless communications. For example, for uplink carrier aggregation in LTE and/or NR, each of the active component carriers used for wireless communications may be treated as a separate radio. Similarly, multi-band transmissions for IEEE 802.11 communications may be treated as separate radios for each band (e.g., 2.4 GHz, 5 GHz, or 6 GHz). As used herein, a "minimum reserve" or merely "reserve" may refer to a minimum level of transmit power allocated to one or more radios for a certain duration (e.g., a transmission occasion, a time window associated with a (time-averaged) RF exposure limit, or a portion thereof).

The following description provides examples of RF exposure compliance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs, or may support multiple RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems and/or to wireless technologies such as 802.11, 802.15, etc.

NR access may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability specifications. These services may also have different transmission time intervals (TTIs) to meet respective quality of service (QoS) specifications. In addition, these services may co-exist in the same subframe. NR supports beamforming, and beam direction may be dynamically configured. Multiple-input, multiple-output (MIMO) transmissions with precoding may also be supported, as may multi-layer transmissions. Aggregation of multiple cells may be supported.

Example Wireless Communication Network and Devices

FIG. 1 illustrates an example wireless communication network 100 in which aspects of the present disclosure may be performed. For example, the wireless communication network 100 may be an NR system (e.g., a 5G NR network), an Evolved Universal Terrestrial Radio Access (E-UTRA) system (e.g., a 4G network), a Universal Mobile Telecommunications System (UMTS) (e.g., a 2G/3G network), or a code division multiple access (CDMA) system (e.g., a 2G/3G network), or may be configured for communications according to an IEEE standard such as one or more of the 802.11 standards, etc. As shown in FIG. 1, the UE 120a includes an RF exposure manager 122 that ensures RF exposure compliance using reserves allocated to radios per antenna group, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
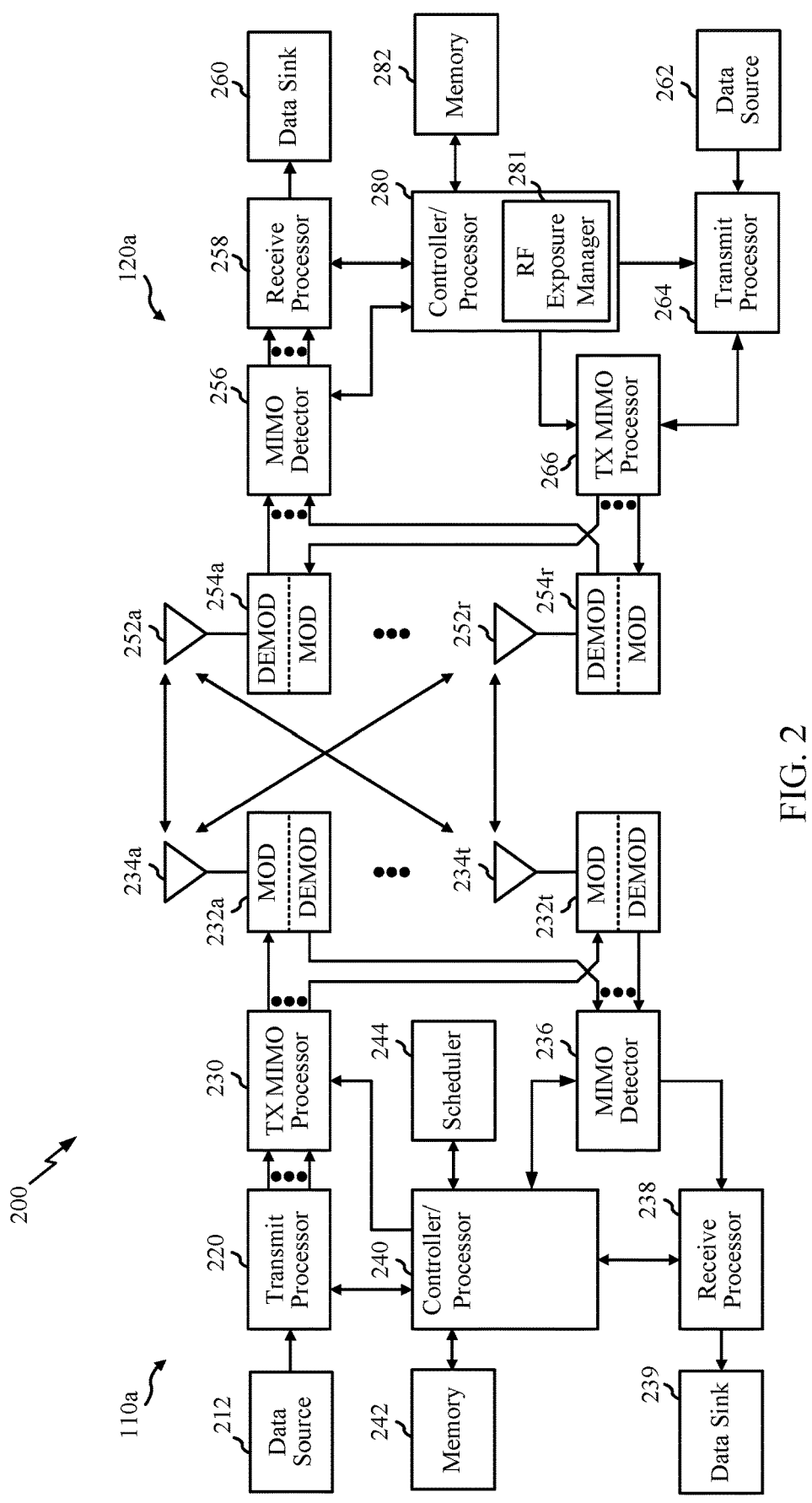
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that is representative of the RF exposure manager 122, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above is an example of another UE 120.

Example RF Transceiver

Figure 3:
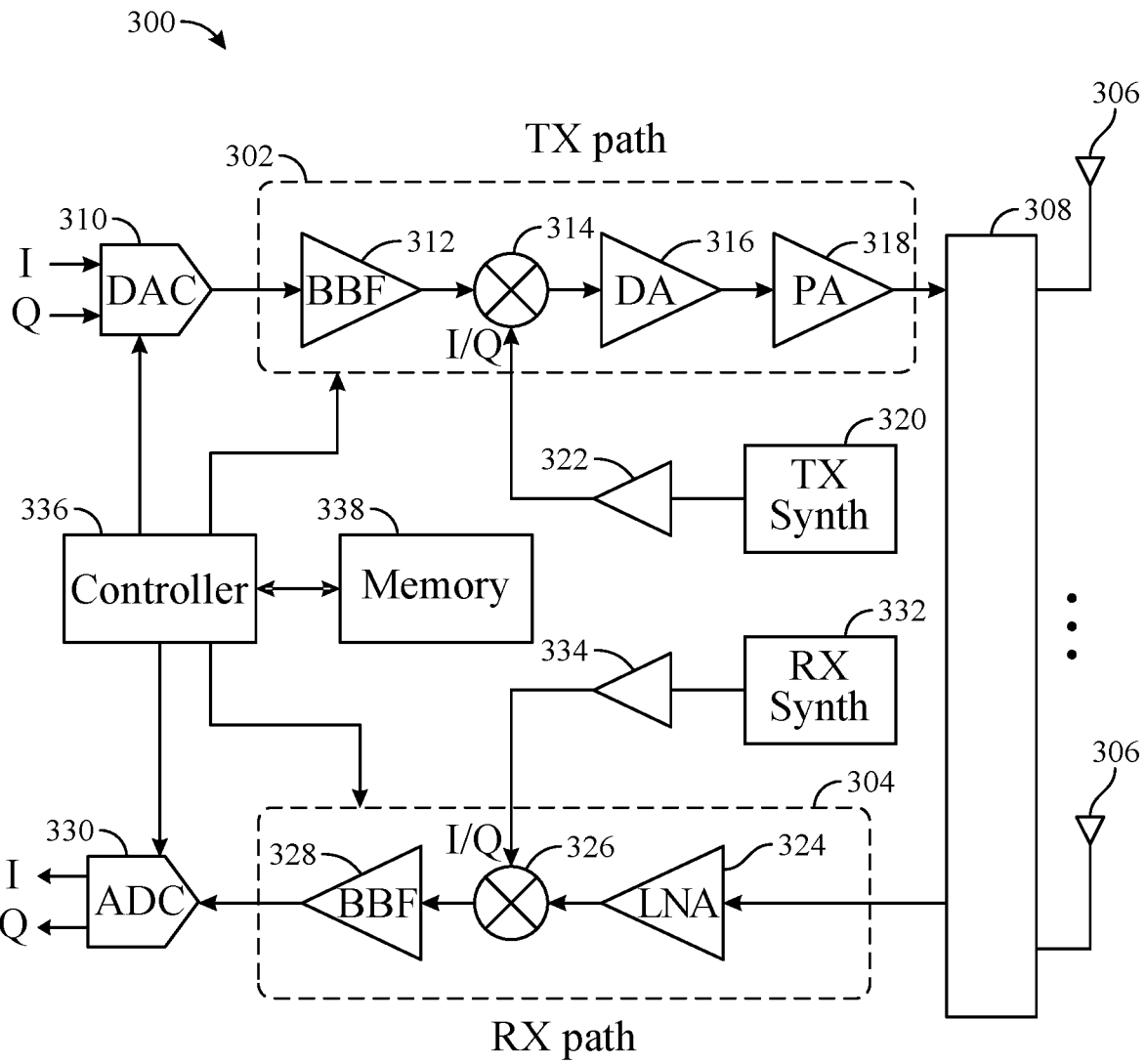
FIG. 3 is a block diagram of an example radio frequency (RF) transceiver, in accordance with certain aspects of the present disclosure.

FIG. 3 is a block diagram of an example RF transceiver circuit 300, in accordance with certain aspects of the present disclosure. The RF transceiver circuit 300 includes at least one transmit (TX) path 302 (also known as a transmit chain) for transmitting signals via one or more antennas 306 and at least one receive (RX) path 304 (also known as a receive chain) for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Certain transceivers may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power applied to the TX path 302 (e.g., certain levels of gain at the PA 318) that complies with an RF exposure limit set by country-specific regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of $mW/cm^2$. In certain cases, a maximum permissible exposure (MPE) limit in terms of PD may be imposed for wireless devices using transmission frequencies above 6 GHz. The MPE limit is a regulatory metric for exposure based on area, e.g., an energy density limit defined as a number, X, watts per square meter $(W/m^2)$ averaged over a defined area and time-averaged over a frequency-dependent time window in order to prevent a human exposure hazard represented by a tissue temperature change.

SAR may be used to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used to assess RF exposure for transmission frequencies higher than 6 GHz, which cover wireless communication technologies such as IEEE 802.11ad, 802.11ay, 5G in mmWave bands, etc. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11 ay). In certain aspects, the wireless device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. As used herein, sub-6 GHz bands may include frequency bands of 300 MHz to 6,000 MHz in some examples, and may include bands in the 6,000 MHz and/or 7,000 MHz range in some examples.

Figures 4A, 4B, 4C:
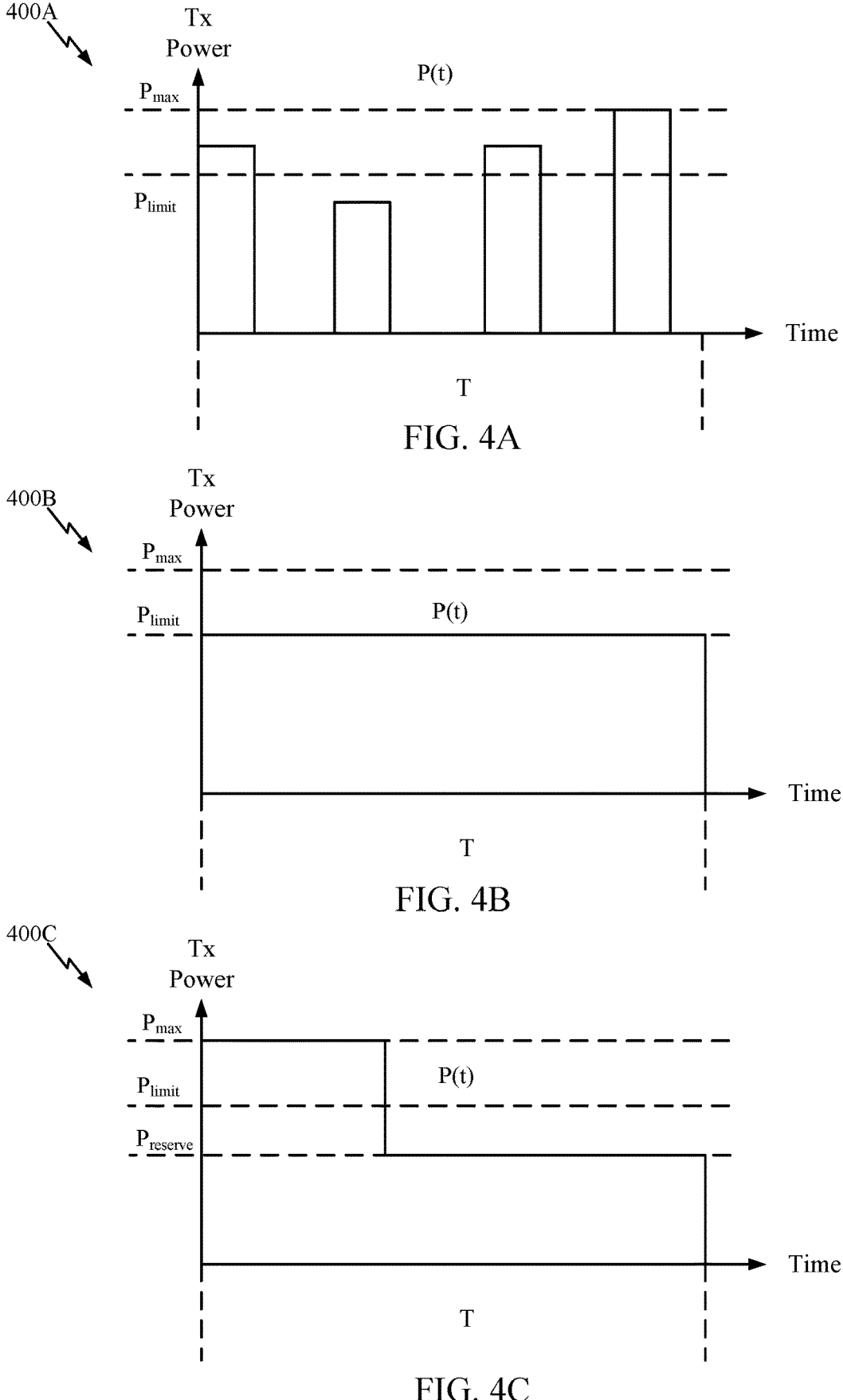
FIGS. 4A, 4B, and 4C are graphs illustrating examples of transmit powers over time in compliance with a time-averaged RF exposure limit, in accordance with certain aspects of the present disclosure.

In certain cases, compliance with an RF exposure limit may be performed as a time-averaged RF exposure evaluation within a specified time window (T) (e.g., 2 seconds for 60 GHz bands, 100 or 360 seconds for bands ≤6 GHz, etc.) associated with the RF exposure limit. FIG. 4A is a graph 400A of a transmit power over time (P(t)) that varies over a time window (T) associated with the RF exposure limit, in accordance with certain aspects of the present disclosure. As an example, the instantaneous transmit power may exceed a maximum time-averaged transmit power level $P_{limit}$ in certain transmission occasions in the time window (T). That is, the transmit power may be greater than the maximum time-averaged transmit power level $P_{limit}$. In certain cases, the UE may transmit at $P_{max}$, which is the maximum transmit power supported by the UE. In certain cases, the UE may transmit at a transmit power less than or equal to the maximum time-averaged transmit power level $P_{limit}$ in certain transmission occasions. The maximum time-averaged transmit power level $P_{limit}$ represents the time-averaged threshold in terms of transmit power for the RF exposure limit over the time window (T), and in certain cases, $P_{limit}$ may be referred to as the maximum time-averaged power level or limit, or in terms of exposure, the maximum time-averaged RF exposure level or limit. The graph 400A also illustrates gaps between transmission bursts, where the gaps represent periods during which no transmission was output from the device.

In certain cases, the transmit power may be maintained at the maximum time-averaged transmit power level (e.g., $P_{limit}$) allowed for RF exposure compliance that enables continuous transmission during the time window. For example, FIG. 4B is a graph 400B of a transmit power over time (P(t)) illustrating an example where the transmit power is limited to $P_{limit}$, in accordance with certain aspects of the present disclosure. As shown, the UE can transmit continuously at $P_{limit}$ in compliance with the RF exposure limit.

FIG. 4C is a graph 400C of a transmit power over time (P(t)) illustrating a time-average mode that provides a reserve power to enable a continuous transmission within the time window (T), in accordance with certain aspects of the present disclosure. As shown, the transmit power may be backed off from the maximum instantaneous power $(P_{max})$ to a reserve power $(P_{reserve})$ that the UE can continue transmitting at the lower power $(P_{reserve})$ to maintain a continuous transmission during the time window (e.g., maintain a radio connection with a receiving entity). In FIG. 4C, the area between $P_{max}$ and $P_{reserve}$ for the time duration of $P_{max}$ may be equal to the area between $P_{limit}$ and $P_{reserve}$ for the time window T, such that the area of transmit power (P(t)) in FIG. 4C is equal to the area of $P_{limit}$ for the time window T. Such an area may be considered using 100% of the energy (transmit power or exposure) to remain compliant with the time-averaged RF exposure limit. Without the reserve power $P_{reserve}$, the transmitter may transmit at $P_{max}$ for a portion of the time window with the transmitter turned off for the remainder of the time window to ensure compliance with the time-averaged RF exposure limit. In some aspects, $P_{reserve}$ is set at a fixed power used to serve for a purpose (e.g., reserving power for certain communications). The transmit duration at $P_{max}$ may be referred to as the burst transmit time (or high power duration). When more margin is available in the future (after T seconds), the transmitter may be allowed to transmit at a higher power again (e.g., in short bursts at $P_{max}$).

In some aspects, the UE may transmit at a power that is higher than the average power level, but less than $P_{max}$ in the time-average mode illustrated in FIG. 4C. While a single transmit burst is illustrated in FIG. 4C, it will be understood that the UE may instead utilize a plurality of transmit bursts within the time window (T), for example, as described herein with respect to FIG. 4A, where the transmit bursts may be separated by periods during which the transmit power is maintained at or below $P_{reserve}$. Further, it will be understood that the transmit power of each transmit burst may vary (either within the burst and/or in comparison to other bursts), and that at least a portion of the burst may be transmitted at a power above the maximum average power level (e.g., $P_{limit}$).

While FIGS. 4A-4C illustrate continuous transmission over a window, occasion, burst, etc., it will be understood that a duty cycle for transmission may be implemented. In such implementations, a transmit power may be zero periodically and maintained at a higher level (e.g., a level as illustrated in FIGS. 4A-4C) during other portions of the duty cycle. As used herein, the duty cycle of the transmission may refer to a portion (e.g., 5 ms) of a specific period (e.g., 500 ms) in which one or more signals are transmitted. In certain cases, the duty cycle may be standardized (e.g., predetermined) with a specific RAT and/or vary over time, for example, due to changes in radio conditions, mobility, and/or user behavior.

In certain cases, the wireless device may evaluate RF exposure compliance in terms of one or more antenna groups, where an antenna group may be a collection of antennas and/or antenna modules. The antenna groups may be treated mutually exclusive of each other in terms of RF exposure. For example, the wireless device may evaluate the RF exposure compliance for an antenna group independently of the RF exposure compliance for another antenna group. The antennas and/or antenna modules may support multiple RATs.

Figure 5:
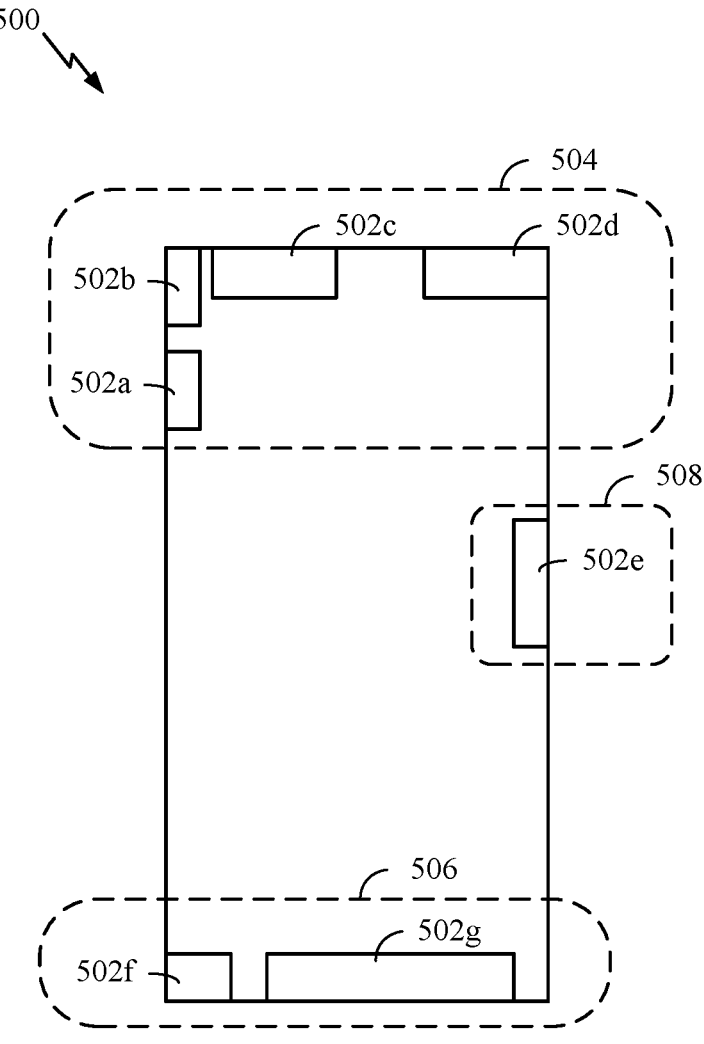
FIG. 5 is a block diagram illustrating an example grouping of multiple antennas of a wireless communication device.

FIG. 5 is a block diagram illustrating an example grouping of multiple antennas of a wireless communication device 500, in accordance with certain aspects of the present disclosure. In this example, the wireless communication device 500 (e.g., a UE 120, such as a smartphone, or any of the wireless communication devices described herein) includes a first antenna 502a, a second antenna 502b, a third antenna 502c, a fourth antenna 502d, a fifth antenna 502e, a sixth antenna 502f, and a seventh antenna 502g. The antennas 502a-502g are arranged into three antenna groups 504, 506, 508, which roughly correspond to a top of the device 500, a bottom of the device 500, and a side of the device 500, when the device 500 is held in the upright position. Those of skill in the art will appreciate that more or less than seven antennas may be implemented, and/or more or less than three antenna groupings may be defined. Each of the illustrated antennas 502a-502g may represent a single antenna, an array (e.g., a phased array) of antennas, or a module including one or more antennas. The antenna groups 504, 506, 508 may each include one or more antennas that are configured to transmit in a certain frequency band (e.g., very high (e.g., mmWave bands), high (e.g., 6-7 GHz bands), medium (e.g., 3-6 GHz bands), or low (e.g., 400 MHz-3 GHz bands)), or the antenna groups may each include one or more antennas that are configured to transmit in multiple frequency bands.

In aspects, the antenna groupings described herein may be assigned into various antenna groupings (such as a mmWave grouping, a sub-6 GHz grouping, a low band grouping (e.g., 400 MHz-3 GHz bands), a mixed-mode grouping (e.g., mmWave and sub-6 GHz grouping), a multi-RAT grouping (e.g., WWAN and WLAN), groupings for different exposure scenarios and/or device positions relative to the user's body, etc.), for example, for differing transmit scenarios. As an example, under a mmWave grouping, each mmWave module (e.g., the first antenna 502a, the third antenna 502c, and the fifth antenna 502e) may be treated as a separate antenna group, where each mmWave module may have multiple antenna elements (e.g., 64 dual polarization antenna elements) arranged in one or more arrays. The mmWave module may be capable of transmitting various beams via predefined antenna configurations, where the beams may form a codebook. Under a sub-6 GHz grouping, sub-6 GHz antennas may be grouped into separate groups. For example, the second and fourth antennas 502b, 502d may be assigned to a group, and the sixth and seventh antennas 502f, 502g may be assigned to another group. In certain cases, the antennas 502a-502g may be assigned to a mixed-mode grouping, such as the three antenna groups 504, 506, 508. Each antenna may be included in a separate antenna group, as illustrated, or one or more antennas may be included in multiple antenna groups.

The antenna groups may be defined and/or operated so as to be mutually exclusive in terms of RF exposure. In certain aspects, the transmit power of one or more of the antenna groups (or of one or more of the antennas within one or more groups) may be reduced such that the (normalized) sum of the exposure of all antenna groups, or of the overlapped RF exposure distributions, are less than a particular value (e.g., 1.0).

In certain cases, a wireless device may evaluate RF exposure compliance for two radios of a specific RAT (e.g., LTE or 5G NR) or a class of RATs, such as WWAN access technologies (e.g., LTE and 5G NR). The wireless device may be configured with a minimum reserve per antenna group associated with two radios used for WWAN communications and a ratio used to split the minimum reserve among the radios when both radios are actively transmitting at the same time. The minimum reserve may be configured in terms of a normalized exposure level. When both of the radios are transmitting at the same time, the wireless device may divide the minimum reserve among the radios based on the configured ratio. When only one of the radios are transmitting, the wireless device may allocate at least the entire minimum reserve to the respective radio.

In a dual-radio transmit scenario (e.g., LTE or NR inter-band carrier aggregation, dual connectivity, etc.), where two radios are transmitting simultaneously (or in the same time interval associated with a time-averaging time window) in the same antenna group, the secondary radio may be allocated a portion of the minimum reserve for a particular antenna group as provided by the following expression:

$$\text{Reserve}_{radio2} = \text{secondary\_split\_ratio}_{AGk} \\ * NE_{totalMinRsv,AGk} \tag{1}$$

where $\text{secondary\_split\_ratio}_{AGk}$ is representative of the percentage of the minimum reserve allocated to the secondary radio, and the $NE_{totalMinRsv,AGk}$ is the amount of minimum reserve allocated to a particular antenna group (AGk). The primary radio may be allocated the remaining portion of the minimum reserve given by:

$$\text{Reserve}_{radio1} = (1 - \text{secondary\_split\_ratio}_{AGk}) \\ * NE_{totalMinRsv,AGk}. \tag{2}$$

In another dual-radio transmit scenario, where two radios are transmitting simultaneously (or in the same time interval) in different antenna groups, the two radios may be allocated at least the respective minimum reserve (e.g., $NE_{totalMinRsv,AGk}$) for the corresponding antenna group.

Example Transmit Energy Allocation Among Different Radio Access Technologies Multi-mode/multi-band UEs have multiple transmit antennas, which can simultaneously transmit in sub-6 GHz bands and bands greater than 6 GHz bands, such as mmWave bands. As described herein, the RF exposure of sub-6 GHz bands may be evaluated in terms of SAR, and the RF exposure of bands greater than 6 GHz may be evaluated in terms of PD. Due to the regulations on simultaneous exposure, the wireless device may limit maximum transmit power for both sub-6 GHz bands and bands greater than 6 GHz.

Aspects of the present disclosure provide apparatus and methods for allocating transmit energy among radios that communicate via different RATs. For example, a wireless device may allocate a minimum reserve among radios in an antenna group. In some cases, the radios in the antenna group may communicate via WWAN (e.g., LTE and 5G NR) and WLAN access technologies (e.g., IEEE 802.11). The wireless device may allocate the minimum reserve among the radios that will be actively transmitting at the same time. In some cases, the wireless device may be configured with a reserve dedicated to a particular RAT, such as Bluetooth, where other radios in the antenna group may share a minimum reserve, as further described herein.

The apparatus and methods for allocating transmit energy among radios described herein may facilitate improved wireless communication performance (e.g., improved signal quality at the receiver, lower latencies, higher throughput, etc.). For example, a wireless device may allocate a portion of a minimum reserve to the radios that are actively transmitting, such that the other radio(s), which are not transmitting, may not be allocated any of the reserve. Such an allocation may allow the radios actively transmitting to obtain a reserve that facilitates improved wireless communication performance. The energy allocation described herein may allow for efficient allocation of a reserve among radios using different RATs.

In certain aspects, the wireless device may be configured with specific reserve information per antenna group, such as the antenna groups described herein with respect to FIG. 5. At least one of the antenna groups may be associated with three or more radios. The radios may communicate via two or more different RATs in some examples, where the different RATs may include, for example, a combination of WWAN and WLAN, a combination of WWAN and Bluetooth, or a combination of WWAN, WLAN, and Bluetooth. The reserve information may include a minimum reserve, $NE_{totalMinRsv,AGk}$, shared among two or more of the radios and radio-specific split ratio(s). Each of the radios associated with the shared minimum reserve may be configured with a split ratio used to determine the portion of the shared minimum allocated to the respective radio. Such a configuration for an antenna group may allow the wireless device to efficiently allocate the reserve across radios communicating via different RATs. The minimum reserve may be shared among radios that are transmitting simultaneously with each other or in the same time interval. As an example, if two of the radios in the antenna group are transmitting at the same time, the wireless device may divide the minimum reserve between those radios, as further described herein.

The wireless device may be configured with a split ratio per radio associated with a shared minimum reserve. For a radio in an active state (e.g., radio(i)), the portion of the minimum reserve for a particular antenna group ($NE_{totalMinRsv,AGk}$) may be determined according to the following expression:

$$Reserve_{radio(i)} = \frac{radio\ (i).split\_ratio}{\sum radio\ (active).split\_ratio} \cdot NE_{totalMinRsv,AGk} \qquad (3)$$

where radio(i).split_ratio is the split ratio for the radio(i), $\Sigma$ radio(active).split_ratio is the sum of split ratio(s) for radio(s) in an active state (e.g., actively transmitting in the same transmission occasion or time interval of a time window associated with a time-averaged RF exposure limit), and i is the index for each radio in the active state. A radio in an active state may refer to a radio that could be or will be transmitting in a particular transmission occasion or (future) time interval of a time window associated with a time-averaged RF exposure limit. For example, a radio in an active state may correspond to when the radio is (or could be or will be) actively transmitting in a transmission occasion or time interval of the time window. The portion of the reserve allocated to the radio(s) that are not in the active state may be set to the remaining portion of the minimum reserve, such as zero.

FIG. 6 is a table 600 illustrating example reserves for a plurality of radios (Radio 1, Radio 2, and Radio 3) of an antenna group (e.g., the antenna group 504, where in this example the antennas in antenna group 504 are coupled to a total of three radios) for different transmit scenarios. In this example, the antenna group may be associated with Radio 1 (e.g., a sub-6 GHz radio for NR), Radio 2 (e.g., a 2.4 GHz radio for IEEE 802.11), and Radio 3 (e.g., a 5 GHz radio for IEEE 802.11), where the split ratio for each of Radio 1, Radio 2, and Radio 3 is set to ⅓ or 33%. The minimum reserve configured for the antenna group is set to 0.6 in terms of normalized exposure. It will be appreciated that the split ratio values being the same among all the radios is merely an example, and the split ratio value may vary among the radios. The split ratio values may be adjusted based on various criteria, such as a priority and/or service associated with a particular radio. The service may include, for example, voice traffic, video traffic, gaming traffic, augmented or virtual reality traffic, video conferencing traffic, an internet-type service, WLAN peer-to-peer (P2P) traffic, cellular vehicle-to-everything (CV2X) traffic, hotspot WLAN traffic, etc. In certain aspects, the reserve level that a radio (or each radio) is assigned may depend on which services are mapped to that radio and/or the reserve level for such service(s). In some cases, certain services may be assigned reserves, such as a reserve level per one or more services, and such service-based reserves may be determined as described herein with respect to the radio-based reserves. For example, a first reserve may be assigned to a first service, and a second reserve may be assigned to a second service. The services may be distributed among multiple radios (e.g., a first radio may transmit traffic associated with a first service, a second radio may transmit traffic associated with a second service, etc.) or on a single radio (e.g., a first radio may transmit traffic associated with a first service and a second service).

In the first transmit scenario, where only Radio 1 is transmitting in the antenna group, the wireless device may allocate at least the entire minimum reserve to Radio 1. As described herein, the minimum reserve may correspond to the minimum level of transmit power allocated to a radio for a certain duration. In certain cases, the wireless device may allow the radio to transmit at a transmit power (e.g., $P_{max}$ as depicted in FIG. 4C) above the minimum reserve in compliance with the time-averaged RF exposure limit. According to Expression (3), radio(i).split_ratio equals the sum of split ratios for radios in the active state, such that Radio 1 is allocated at least the minimum reserve, $NE_{totalMinRsv,AGk}$. One or more of the radios may be allocated a reserve that is higher than the minimum reserve, for example if additional margin is available and/or depending on one or more other criteria, such as characteristics of a transmission (e.g., possible high variability and/or bursty pattern) and/or priority of a radio.

In the second transmit scenario, where all of the radios are in the active state, the wireless device may allocate a portion of the minimum reserve to each of the radios proportional to the split ratio of the respective radio. According to Expression (3), the sum of split ratios for radios in the active state is equal to one (1), such that each of the radios receives a portion of the minimum reserve proportional to the split ratio of the respective radio.

In the third transmit scenario, where Radio 1 and Radio 2 are in the active state, the wireless device may divide the minimum reserve among Radio 1 and Radio 2. According to Expression (3), each of the split ratios for Radio 1 and Radio 2 is equal to half of the sum of the split ratios for radios in the active state, such that the minimum reserve is equally split among Radio 1 and Radio 2.

In the fourth transmit scenario, where Radio 2 and Radio 3 are in the active state, the wireless device may again divide the minimum reserve among Radio 2 and Radio 3. In the fifth transmit scenario, where Radio 2 is in the active state, the wireless device may allocate at least the entire minimum reserve ($NE_{totalMinRsv,AGk}$) to Radio 2.

If a radio in another antenna group is transmitting at the same time as one of Radios 1-3, the example reserves for the transmit scenarios may remain the same, due to the antenna groups being mutually exclusive of each other in terms of exposure.

In some cases, the wireless device may be configured with specific reserve information for a particular radio in an antenna group. For example, certain reserve information may be assigned to a Bluetooth radio in the antenna group. Such a configuration may allow the wireless device to provide a dedicated reserve for a particular radio in certain transmit scenarios. For example, the reserve information may include a different reserve level (e.g., radio.reserve_level$_{AGk}$ or BT.reserve_level$_{AGk}$) for when a radio in the antenna group is transmitting by itself (e.g., standalone) in the antenna group, when two radios in the antenna group are in the active state, and/or when three or more radios in the antenna group are in active state. The reserve information may guarantee a certain amount of reserve for the radio regardless of whether the radio is transmitting. Such a configuration may allow the wireless device to transmit with the radio via at least the guaranteed reserve level and to prevent the guaranteed reserve level being used by another radio.

When the radio with the dedicated reserve information is transmitting by itself, the wireless device may use a particular reserve (e.g., 0.9 or 90%) for the radio associated with such a transmit scenario. When the radio with the dedicated reserve information is transmitting with at least one other radio, the wireless device may use a different reserve for the radio. For example, the reserves for the radios may satisfy the following expression:

$$BT.reserve\_level_{AGk} + NE_{totalMinRsv,AGk} < 1 \qquad (4)$$

where $BT.reserve\_level_{AGk}$ is the dedicated reserve for a Bluetooth radio, and $NE_{totalMinRsv,AGk}$ is the minimum reserve shared among the other radios with different RATs, for example, as described herein with respect to FIG. 6. In certain aspects, the value for $BT.reserve\_level_{AGk}$ when one other radio is transmitting with the Bluetooth radio may be different from when two or more radios are transmitting with the Bluetooth radio. It will be appreciated that the dedicated reserve may be configured for other types of radio, for example, mmWave, a WLAN, satellite communications, etc., and that more than one radio may have a dedicated reserve. Further, the radio with the dedicated reserve need not be a separate RAT from the other radios in the antenna group. For example, the dedicated reserve may be assigned to a radio associated with one or more frequency bands of a RAT, such as a dedicated reserve for a mmWave NR radio or a dedicated reserve for a sub-6 GHz NR radio.

FIG. 7 is a flow diagram illustrating example operations 700 for wireless communication, in accordance with certain aspects of the present disclosure. The operations 700 may be performed, for example, by a wireless device (e.g., the UE 120a in the wireless communication network 100). The operations 700 may be implemented as software components that are executed and run on one or more processors (e.g., controller/processor 280 of FIG. 2). Further, the transmission and/or reception of signals by the wireless device in the operations 700 may be enabled, for example, by one or more antennas (e.g., antennas 252 of FIG. 2). In certain aspects, the transmission and/or reception of signals by the wireless device may be implemented via a bus interface of one or more processors (e.g., controller/processor 280) obtaining and/or outputting signals.

The operations 700 may optionally begin, at block 702, where the wireless device may obtain reserve information associated with an antenna group (e.g., the first antenna group 504) associated with a plurality of radios including a first radio and one or more second radios. The wireless device may obtain the reserve information via memory. For example, the reserve information may be stored in memory (e.g., the memory 282 and/or the memory 338), and the wireless device may access the memory to obtain the reserve information. In some cases, the wireless device may determine the reserve information, as further described herein. The first radio may communicate via a first type of RAT (e.g., WWAN), and the second radio(s) may communicate via a second type of RAT (e.g., WLAN), which is different from the first type of RAT. For example, the wireless device may store the reserve information in a memory device (e.g., the memory 282) and obtain the reserve information from the memory when determining the reserve for the radios.

At block 704, the wireless device may determine a reserve for each of the plurality of radios based at least in part on the reserve information and an active state associated with each of the plurality of radios, for example, as described herein with respect to FIG. 6. In certain cases, the wireless device may determine a portion of a minimum reserve for radios in an active state based on split ratios associated with the radios. In some cases, the wireless device may determine that the reserve for a particular radio is set to zero, for example, when the radio is not in an active state.

At block 706, the wireless device may transmit one or more signals using at least one of the radios at a transmit power determined based at least in part on a RF exposure limit associated with each of the radios and the reserve for each of the radios. For example, the wireless device may determine a transmit power that satisfies the RF exposure limit, where the transmit power for the radio corresponds to at least the reserve for the respective radio. In certain cases, the RF exposure limit may include a maximum time-averaged RF exposure limit, for example, as described herein with respect to FIGS. 4A-4C, and/or all transmissions may be allocated a transmit power at or above (greater than or equal to) the reserve.

The reserve information may include various parameters associated with determining the reserve for a particular radio, for example, as described herein with respect to Expressions (3) and (4). The wireless device may be configured with reserve information per antenna group. For example, the wireless device may be configured with specific reserve information for each of a first antenna group (e.g., the first antenna group 504), a second antenna group (e.g., the second antenna group 508), and a third antenna group (e.g., the third antenna group 508).

In some cases, the reserve information may include a total reserve (e.g., $NE_{totalMinRsv,AGk}$) associated with all (or a subset) of the radios in the antenna group. The total reserve may be a minimum reserve shared among radios in an antenna group, for example, as described herein with respect to FIG. 6. The reserve information may include a split ratio associated with each of the radios sharing a total reserve, where the split ratio may be used to determine a portion of the total reserve allocated to the respective radio in an active state.

To determine the reserve for each of the plurality of radios, the wireless device may determine a sum of split ratios for each of the radios in the active state, for example, according to Expression (3). The wireless device may determine the reserve for each of the radios in the active state as a product of the total reserve and a ratio of the split ratio for the respective radio to the sum of the split ratios, for example, according to Expression (3). As an example, the wireless device may determine the reserve for a radio is equal to the total reserve when only the radio in the antenna group is in the active state. The wireless device may determine the reserve for a radio is equal to a portion of a total reserve when more than one of the radios in the antenna group are in the active state. The portion of the total reserve may be based on the split ratio associated with the particular radio.

In certain aspects, the reserve information may include a reserve dedicated to a particular radio, for example, as described herein with respect to Expression (4). For example, the reserve information may include a first reserve (e.g., $BT.reserve\_level_{AGk}$) associated with the first radio and a second reserve (e.g., $NE_{totalMinRsv,AGk}$) associated with the second radio(s). The first and second reserves may have one or more values associated with a specific transmit scenario. In certain aspects, the first reserve may have a value (e.g., between zero and one) regardless of whether the first radio is in the active state. Each of the first reserve and the second reserve may include a first value for when only one of the radios is in the active state, a second value for when two of the radios are in the active state, and a third value for when three or more of radios are in the active state. The second value of the first reserve may be different than the third value of the first reserve, and the same may apply to the second reserve. The second and third values may satisfy Expression (4).

The reserve for each of the radios in the active state may correspond to a minimum level of transmit power allocated to the respective radio for a certain duration, for example, a transmission occasion, a time window associated with the RF exposure limit, and/or a time interval of the time window. The reserve for a given radio may be allocated by the time-averaging RF exposure algorithm for the entire duration of active radio's operating time window (e.g., 2 seconds, 100 seconds, or 360 seconds depending on the transmission frequency and respective time window of the RF exposure limit). When evaluating the running time-average (reserve in a time slot rolling out of time window may be the same as reserve for time slot rolling into the time window), the reserve may be preserved continuously for the entire duration of a transmission, e.g., indefinitely. It may be assumed that the transmission can continue indefinitely and provide reserve indefinitely, which may be accomplished by allocating the reserve for the entire duration of the active radio's time window associated with the RF exposure limit.

In certain aspects, the wireless device may determine the reserve information periodically or in response to one or more events. For example, the reserve information may be determined periodically every time window associated with the time-averaged RF exposure limit. In some cases, the reserve information may be determined in response to detecting the occurrence of a specific event, such as when the wireless device is powered on, when the wireless device detects a change in radio conditions, when the wireless device detects a change in the number of radios in the active state, etc. In some cases, the reserve information may be preconfigured.

In certain aspects, the wireless device may determine the total reserve based on one or more criteria. For example, the total reserve may be determined based on past RF exposure associated with the radios, a path loss associated with the radios, a scheduling rate associated with the radios, a duty cycle associated with the radios, expected transmission durations associated with the radios, data buffers associated with the radios, or any combination thereof. For example, a high duty cycle associated with the radios may allow the wireless device to increase the total reserve. As another example, the data buffers may indicate the expected transmission durations associated with the radios, and the wireless device may adjust the total reserve in response to the expected transmission durations. A data buffer with a large amount of data may represent a long transmission time, and the wireless device may increase the total reserve in response to the transmission time based on the size of the data in the buffer. The wireless device may dynamically adjust the total reserve periodically and/or in response to certain event(s), such as a change associated with the one or more criteria. It will be appreciated that alternative or additional criteria may be used to determine the total reserve allocated among the radios. Each criterion may be associated with an individual radio or assessed individually for several radios, and/or may be assessed cumulatively for multiple radios.

For certain aspects, the wireless device may allocate the reserves among the radios associated with the antenna group based on one or more criteria. As an example, the wireless device may allocate the reserves among the radios based on $P_{limit}$ associated with the radio(s), past RF exposure usage associated with the radio(s), path loss associated with the radio(s), a data bandwidth associated with the radio(s), a scheduling rate or duty cycle associated with the radio(s), network load, energy per byte (or performance per watt) associated with the radios, link quality (or channel quality) of each radio link, an expected transmission duration associated with the radio(s), a data buffer associated with the radio(s), radio conditions, or any combination thereof. As an example, the wireless device may allocate a greater reserve to a radio with a stronger link quality or lower path loss than the other radio(s). As another example, the wireless device may allocate a greater reserve to a radio with a longer expected transmission duration than the other radio(s), where the size of a data buffer may be representative of the expected transmission duration for a particular radio. For example, the reserves may be allocated based on a service or priority associated with each of the radios. In some such examples, allocation of reserve is dynamic and may change over time based on services in use by the wireless device (e.g., as negotiated with or assigned by a network). Allocation of the reserves among the radios may be performed periodically and/or in response to certain event(s), such as a change associated with the one or more criteria. As another example, a radio associated with a high priority may be allocated more reserve than another radio associated with a low priority. It will be appreciated that additional or alternative criteria may be used to determine the reserves allocated among the radios.

Allocation of the reserves may be performed by adjusting the split ratios associated with the radios. For example, the split ratio can favor a radio with a more efficient link (e.g., a link with lower energy per byte, a lower path loss, a higher $P_{limit}$, etc.) to achieve desirable wireless performance (e.g., a higher throughput or data rate). In some cases, the split ratio can favor a radio with a less efficient link (e.g., a higher path loss) to equalize the performance across the radios.

The operations 700 may be performed per antenna group. The wireless device may be configured with reserve information per antenna group and apply the corresponding reserve information to a particular antenna group when the antenna group is actively transmitting. As the antenna groups may be configured to be mutually exclusive of each other in terms of RF exposure, the operations 700 may be performed independently for each of the antenna groups. For example, the operations 700 may be performed simultaneously for another antenna group.

The wireless device may be configured with multiple sets of antenna groups, and the wireless device may have different reserve information configured per antenna group among the multiple sets of antenna groups. For example, the wireless device may have an antenna group (or a set of antenna groups) configured for a particular exposure scenario (e.g., head exposure), and another antenna group (or another set of antenna groups) configured for a different exposure scenario (e.g., hand and body exposure). The wireless device may select the antenna group for the corresponding exposure scenario, and the wireless device may select the reserve information associated with the respective antenna group.

While the examples depicted in FIGS. 1-7 are described herein with respect to a UE performing the various methods for providing RF exposure compliance to facilitate understanding, aspects of the present disclosure may also be applied to other wireless devices, such as a wireless station, an access point, a base station and/or a customer premises equipment (CPE), performing the RF exposure compliance described herein. Further, while the examples are described with respect to communications between the UE (or other wireless device) and a network entity, the UE or other wireless device may be communicating with a device other than a network entity, for example another UE or with another device in a user's home that is not a network entity, for example.

It will be appreciated that the allocation of transmit energy among radios described herein may enable desirable wireless communication performance, such as reduced latencies, increased uplink data rates, and/or an uplink connection at the edge of a cell.

Example Communications Device

Figure 8:
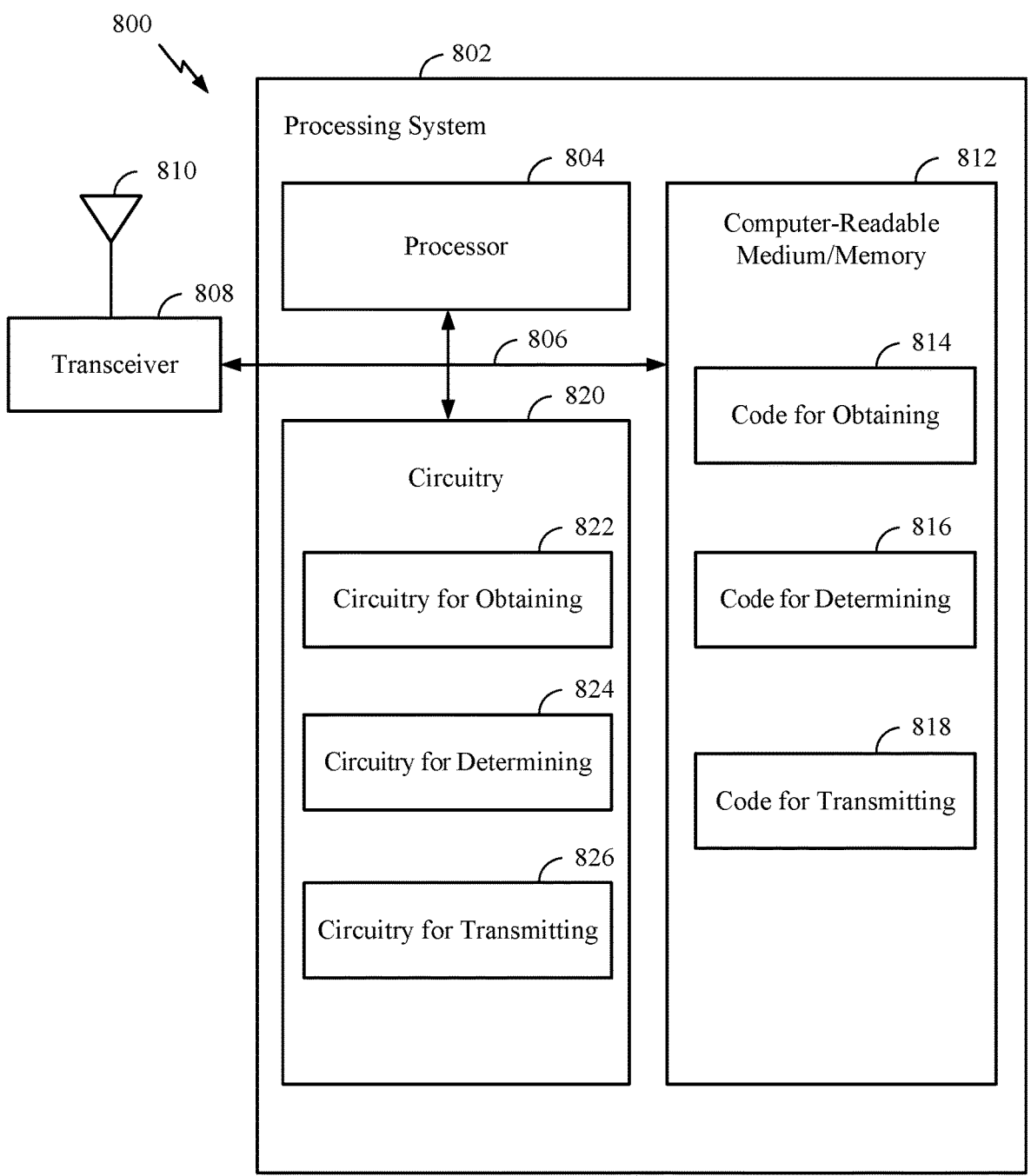
FIG. 8 illustrates a communications device (e.g., a UE) that may include various components configured to perform operations for the techniques disclosed herein, in accordance with certain aspects of the present disclosure.

FIG. 8 illustrates a communications device 800 (e.g., the UE 120) that may include various components (e.g., corresponding to means-plus-function components) configured to perform operations for the techniques disclosed herein, such as the operations illustrated in FIG. 7. The communications device 800 includes a processing system 802, which may be coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the communications device 800 to perform the operations 700 illustrated in FIG. 7, or other operations for performing the various techniques discussed herein for providing RF exposure compliance. In certain aspects, computer-readable medium/memory 812 stores code for obtaining 814, code for determining 816, code for transmitting (or outputting) 818, or any combination thereof.

In certain aspects, the processing system 802 has circuitry 820 configured to implement the code stored in the computer-readable medium/memory 812. In certain aspects, the circuitry 820 is coupled to the processor 804 and/or the computer-readable medium/memory 812 via the bus 806. For example, the circuitry 820 includes circuitry for obtaining 822, circuitry for determining 824, circuitry for transmitting (or outputting) 826, or any combination thereof.

In some examples, means for transmitting or sending (or means for outputting for transmission) may include the transceivers 254 and/or antenna(s) 252 of the UE 120 illustrated in FIG. 2 and/or transceiver 808 and antenna 810 of the communications device 800 in FIG. 8.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for obtaining and/or means for determining may include various processing system components, such as: the processor 804 in FIG. 8, or aspects of the UE 120 depicted in FIG. 2, including receive processor 258, transmit processor 264, TX MIMO processor 266, and/or controller/processor 280.

Example Aspects

Implementation examples are described in the following numbered clauses:

Clause 1: A method of wireless communication by a wireless device, comprising: obtaining reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology; determining a reserve for each of the plurality of radios based at least in part on the reserve information and an active state associated with each of the plurality of radios; and transmitting one or more signals using at least one of the plurality of radios at a transmit power determined based at least in part on a radio frequency (RF) exposure limit associated with each of the plurality of radios and the reserve for each of the plurality of radios.

Clause 2: The method of Clause 1, wherein the reserve information includes a total reserve associated with all of the plurality of radios in the antenna group.

Clause 3: The method of Clause 1 or 2, wherein the reserve information includes a first reserve associated with the first radio and a second reserve associated with the one or more second radios.

Clause 4: The method of Clause 3, wherein each of the first reserve and the second reserve includes: a first value for when only one of the plurality of radios is in the active state, a second value for when only two of the plurality of radios are in the active state, and a third value for when three or more of the plurality of radios are in the active state.

Clause 5: The method according to any of Clauses 1-4, wherein the reserve information includes a split ratio associated with each of the plurality of radios sharing a total reserve.

Clause 6: The method of Clause 5, wherein determining the reserve for each of the plurality of radios comprises: determining a sum of split ratios for each of the radios in the active state; and determining the reserve for each of the radios in the active state as a product of the total reserve and a ratio of the split ratio for the respective radio to the sum of the split ratios.

Clause 7: The method according to any of Clauses 1-5, wherein determining the reserve for each of the plurality of radios comprises determining the reserve for a radio is equal to a total reserve when only the radio in the antenna group is in the active state.

Clause 8: The method according to any of Clauses 1-5, wherein determining the reserve for each of the plurality of radios comprises determining the reserve for a radio is equal to a portion of a total reserve when more than one of the radios in the antenna group are in the active state.

Clause 9: The method of any of the preceding Clauses, wherein the reserve for each of the plurality of radios is a minimum level of transmit power allocated to the respective radio for a time window associated with the RF exposure limit.

Clause 10: The method of any of the preceding Clauses, wherein the RF exposure limit comprises a maximum time-averaged RF exposure limit.

Clause 11: The method of any of the preceding Clauses, wherein determining the reserve for each of the plurality of radios comprises determining the reserve for each of the plurality of radios further based at least in part on one or more criteria.

Clause 12: The method of Clause 11, wherein the one or more criteria include: a maximum time-averaged transmit power level associated with the plurality of radios, past RF exposure associated with the plurality of radios, a path loss associated with the plurality of radios, a data bandwidth associated with the plurality of radios, a scheduling rate or duty cycle associated with the plurality of radios, a network load, energy per byte associated with the plurality of radios, a link quality associated with the plurality of radios, an expected transmission duration associated with the plurality of radios, a data buffer associated with the plurality of radios, or any combination thereof Clause 13: The method of any of the preceding Clauses, wherein the reserve information is based on reserve levels for services mapped to the plurality of radios.

Clause 14: An apparatus for wireless communication, comprising: a memory; and at least one processor coupled to the memory, the at least one processor being configured to: obtain reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology, determine a reserve for each of the plurality of radios based at least in part on the reserve information and an active state associated with each of the plurality of radios, and transmit one or more signals using at least one of the plurality of radios at a transmit power determined based at least in part on a radio frequency (RF) exposure limit associated with each of the plurality of radios and the reserve for each of the plurality of radios.

Clause 15: The apparatus of Clause 14, wherein the reserve information includes a total reserve associated with all of the plurality of radios in the antenna group.

Clause 16: The apparatus of Clause 14 or 15, wherein the reserve information includes a first reserve associated with the first radio and a second reserve associated with the one or more second radios.

Clause 17: The apparatus of Clause 16, wherein each of the first reserve and the second reserve includes: a first value for when only one of the plurality of radios is in the active state, a second value for when only two of the plurality of radios are in the active state, and a third value for when three or more of the plurality of radios are in the active state.

Clause 18: The apparatus according to any of Clauses 14-17, wherein the reserve information includes a split ratio associated with each of the plurality of radios sharing a total reserve.

Clause 19: The apparatus of Clause 18, wherein to determine the reserve for each of the plurality of radios, the at least one processor is further configured to: determine a sum of split ratios for each of the radios in the active state, and determine the reserve for each of the radios in the active state as a product of the total reserve and a ratio of the split ratio for the respective radio to the sum of the split ratios.

Clause 20: The apparatus according to any of Clauses 14-19, wherein to determine the reserve for each of the plurality of radios, the at least one processor is further configured to determine the reserve for a radio is equal to a total reserve when only the radio in the antenna group is in the active state.

Clause 21: The apparatus according to any of Clauses 14-19, wherein to determine the reserve for each of the plurality of radios, the at least one processor is further configured to determine the reserve for a radio is equal to a portion of a total reserve when more than one of the radios in the antenna group are in the active state.

Clause 22: The apparatus according to any of Clauses 14-21, wherein the reserve for each of the plurality of radios is a minimum level of transmit power allocated to the respective radio for a time window associated with the RF exposure limit.

Clause 23: The apparatus according to any of Clauses 14-22, wherein the RF exposure limit comprises a maximum time-averaged RF exposure limit.

Clause 24: The apparatus according to any of Clauses 14-23, wherein to determine the reserve for each of the plurality of radios, the at least one processor is further configured to determine the reserve for each of the plurality of radios further based at least in part on one or more criteria.

Clause 25: The apparatus of Clause 24, wherein the one or more criteria include: a maximum time-averaged transmit power level associated with the plurality of radios, past RF exposure associated with the plurality of radios, a path loss associated with the plurality of radios, a data bandwidth associated with the plurality of radios, a scheduling rate or duty cycle associated with the plurality of radios, a network load, energy per byte associated with the plurality of radios, a link quality associated with the plurality of radios, an expected transmission duration associated with the plurality of radios, a data buffer associated with the plurality of radios, or any combination thereof.

Clause 26: The apparatus according to any of Clauses 14-25, wherein to determine the reserve for each of the plurality of radios, the at least one processor is configured to determine the reserve for each of the plurality of radios based further on a service or priority associated with each of the plurality of radios.

Clause 27: A non-transitory computer-readable medium having instructions stored thereon for: obtaining reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology; determining a reserve for each of the plurality of radios based at least in part on the reserve information and an active state associated with each of the plurality of radios; and transmitting one or more signals using at least one of the plurality of radios at a transmit power determined based at least in part on a radio frequency (RF) exposure limit associated with each of the plurality of radios and the reserve for each of the plurality of radios.

Clause 28: The non-transitory computer-readable medium of Clause 27, wherein the reserve information includes a total reserve associated with all of the plurality of radios in the antenna group.

Clause 29: The non-transitory computer-readable medium of Clause 27 or 28, wherein the reserve information includes a first reserve associated with the first radio and a second reserve associated with the one or more second radios.

Clause 30: The non-transitory computer-readable medium of Clause 29, wherein each of the first reserve and the second reserve includes: a first value for when only one of the plurality of radios is in the active state, a second value for when only two of the plurality of radios are in the active state, and a third value for when three or more of the plurality of radios are in the active state.

Clause 31: The non-transitory computer-readable medium according to any of Clauses 27-30, wherein the reserve information includes a split ratio associated with each of the plurality of radios sharing a total reserve.

Clause 32: The non-transitory computer-readable medium of Clause 31, wherein determining the reserve for each of the plurality of radios comprises: determining a sum of split ratios for each of the plurality of radios in the active state; and determining the reserve for each of the plurality of radios in the active state as a product of the total reserve and a ratio of the split ratio for the respective radio to the sum of the split ratios.

Clause 33: An apparatus comprising: a memory comprising executable instructions; and one or more processors configured to execute the executable instructions and cause the apparatus to perform a method in accordance with any of Clauses 1-13.

Clause 34: An apparatus comprising means for performing a method in accordance with any of Clauses 1-13.

Clause 35: A non-transitory computer-readable medium comprising executable instructions that, when executed by one or more processors of an apparatus, cause the apparatus to perform a method in accordance with any of Clauses 1-13.

Clause 36: A computer program product embodied on a computer-readable storage medium comprising code for performing a method in accordance with any of Clauses 1-13.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, generating, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a UE (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, or a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of wireless communication by a wireless device, comprising:

obtaining reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology;

determining a reserve for each of the plurality of radios based at least in part on the reserve information and an active state associated with each of the plurality of radios; and transmitting one or more signals using at least one of the plurality of radios at a transmit power determined based at least in part on a radio frequency (RF) exposure limit associated with each of the plurality of radios and the reserve for each of the plurality of radios.

2. The method of claim 1, wherein the reserve information includes a total reserve associated with all of the plurality of radios in the antenna group.

3. The method of claim 1, wherein the reserve information includes a first reserve associated with the first radio and a second reserve associated with the one or more second radios.

4. The method of claim 3, wherein each of the first reserve and the second reserve includes:

a first value for when only one of the plurality of radios is in the active state, a second value for when only two of the plurality of radios are in the active state, and a third value for when three or more of the plurality of radios are in the active state.

5. The method of claim 1, wherein the reserve information includes a split ratio associated with each of the plurality of radios sharing a total reserve.

6. The method of claim 5, wherein determining the reserve for each of the plurality of radios comprises:

determining a sum of split ratios for each of the radios in the active state; and determining the reserve for each of the radios in the active state as a product of the total reserve and a ratio of the split ratio for the respective radio to the sum of the split ratios.

7. The method of claim 1, wherein determining the reserve for each of the plurality of radios comprises determining the reserve for a radio is equal to a total reserve when only the radio in the antenna group is in the active state.

8. The method of claim 1, wherein determining the reserve for each of the plurality of radios comprises determining the reserve for a radio is equal to a portion of a total reserve when more than one of the radios in the antenna group are in the active state.

9. The method of claim 1, wherein the reserve for each of the plurality of radios is a minimum level of transmit power allocated to the respective radio for a time window associated with the RF exposure limit.

10. The method of claim 1, wherein the RF exposure limit comprises a maximum time-averaged RF exposure limit.

11. The method of claim 1, wherein determining the reserve for each of the plurality of radios comprises determining the reserve for each of the plurality of radios further based at least in part on one or more criteria.

12. The method of claim 11, wherein the one or more criteria include:

a maximum time-averaged transmit power level associated with the plurality of radios, past RF exposure associated with the plurality of radios, a path loss associated with the plurality of radios, a data bandwidth associated with the plurality of radios, a scheduling rate or duty cycle associated with the plurality of radios, a network load, energy per byte associated with the plurality of radios, a link quality associated with the plurality of radios, an expected transmission duration associated with the plurality of radios, a data buffer associated with the plurality of radios, or any combination thereof.

13. The method of claim 1, wherein the reserve information is based on reserve levels for services mapped to the plurality of radios.

14. An apparatus for wireless communication, comprising:

a memory; and at least one processor coupled to the memory, the at least one processor being configured to:

obtain reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology, determine a reserve for each of the plurality of radios based at least in part on the reserve information and an active state associated with each of the plurality of radios, and transmit one or more signals using at least one of the plurality of radios at a transmit power determined based at least in part on a radio frequency (RF) exposure limit associated with each of the plurality of radios and the reserve for each of the plurality of radios.

15. The apparatus of claim 14, wherein the reserve information includes a total reserve associated with all of the radios in the antenna group.

16. The apparatus of claim 14, wherein the reserve information includes a first reserve associated with the first radio and a second reserve associated with the one or more second radios.

17. The apparatus of claim 16, wherein each of the first reserve and the second reserve includes:

a first value for when only one of the plurality of radios is in the active state, a second value for when only two of the plurality of radios are in the active state, and a third value for when three or more of the plurality of radios are in the active state.

18. The apparatus of claim 14, wherein the reserve information includes a split ratio associated with each of the plurality of radios sharing a total reserve.

19. The apparatus of claim 18, wherein to determine the reserve for each of the plurality of radios, the at least one processor is further configured to:

determine a sum of split ratios for each of the radios in the active state, and determine the reserve for each of the radios in the active state as a product of the total reserve and a ratio of the split ratio for the respective radio to the sum of the split ratios.

20. The apparatus of claim 14, wherein to determine the reserve for each of the plurality of radios, the at least one processor is further configured to determine the reserve for a radio is equal to a total reserve when only the radio in the antenna group is in the active state.

21. The apparatus of claim 14, wherein to determine the reserve for each of the plurality of radios, the at least one processor is further configured to determine the reserve for a radio is equal to a portion of a total reserve when more than one of the radios in the antenna group are in the active state.

22. The apparatus of claim 14, wherein the reserve for each of the plurality of radios is a minimum level of transmit power allocated to the respective radio for a time window associated with the RF exposure limit.

23. The apparatus of claim 14, wherein the RF exposure limit comprises a maximum time-averaged RF exposure limit.

24. The apparatus of claim 14, wherein to determine the reserve for each of the plurality of radios, the at least one processor is further configured to determine the reserve for each of the plurality of radios further based at least in part on one or more criteria.

25. The apparatus of claim 24, wherein the one or more criteria include:

a maximum time-averaged transmit power level associated with the plurality of radios, past RF exposure associated with the plurality of radios, a path loss associated with the plurality of radios, a data bandwidth associated with the plurality of radios, a scheduling rate or duty cycle associated with the plurality of radios, a network load, energy per byte associated with the plurality of radios, a link quality associated with the plurality of radios, an expected transmission duration associated with the plurality of radios, a data buffer associated with the plurality of radios, or any combination thereof.

26. The apparatus of claim 14, wherein to determine the reserve for each of the plurality of radios, the at least one processor is configured to determine the reserve for each of the plurality of radios based further on a service or priority associated with each of the plurality of radios.

27. A computer-readable medium having instructions stored thereon for:

obtaining reserve information associated with an antenna group associated with a plurality of radios including a first radio and one or more second radios, wherein the first radio communicates via a first type of radio access technology, and wherein the one or more second radios communicate via a second type of radio access technology, which is different from the first type of radio access technology;

determining a reserve for each of the plurality of radios based at least in part on the reserve information and an active state associated with each of the plurality of radios; and transmitting one or more signals using at least one of the plurality of radios at a transmit power determined based at least in part on a radio frequency (RF) exposure limit associated with each of the plurality of radios and the reserve for each of the plurality of radios.

28. The computer-readable medium of claim 27, wherein the reserve information includes a total reserve associated with all of the plurality of radios in the antenna group.

29. The computer-readable medium of claim 27, wherein the reserve information includes a first reserve associated with the first radio and a second reserve associated with the one or more second radios, and wherein each of the first reserve and the second reserve includes:

a first value for when only one of the plurality of radios is in the active state, a second value for when only two of the plurality of radios are in the active state, and a third value for when three or more of the plurality of radios are in the active state.

30. The computer-readable medium of claim 27, wherein the reserve information includes a split ratio associated with each of the plurality of radios sharing a total reserve, and wherein determining the reserve for each of the plurality of radios comprises:

determining a sum of split ratios for each of the plurality of radios in the active state; and determining the reserve for each of the plurality of radios in the active state as a product of the total reserve and a ratio of the split ratio for the respective radio to the sum of the split ratios.

* * * * *